United States Patent
Ruohio et al.

(10) Patent No.: US 11,415,418 B2
(45) Date of Patent: Aug. 16, 2022

(54) OUT-OF-PLANE SENSING GYROSCOPE ROBUST TO EXTERNAL ACCELERATION AND ROTATION

(71) Applicant: INVENSENSE, INC., San Jose, CA (US)

(72) Inventors: Jaakko Ruohio, Milan (IT); Luca Coronato, Corsico (IT); Giacomo Gafforelli, Casatenovo (IT)

(73) Assignee: INVENSENSE, INC., San Jose, CA (US)

( * ) Notice: Subject to any disclaimer, the term of this patent is extended or adjusted under 35 U.S.C. 154(b) by 173 days.

(21) Appl. No.: 16/663,629

(22) Filed: Oct. 25, 2019

(65) Prior Publication Data

US 2020/0096338 A1    Mar. 26, 2020

Related U.S. Application Data

(63) Continuation of application No. 15/479,079, filed on Apr. 4, 2017, now Pat. No. 10,466,053.

(51) Int. Cl.
*G01C 19/5747* (2012.01)

(52) U.S. Cl.
CPC ................ *G01C 19/5747* (2013.01)

(58) Field of Classification Search
CPC .......... G01P 2015/0814; G01C 19/574; G01C 19/5747
See application file for complete search history.

(56) References Cited

U.S. PATENT DOCUMENTS

| | | | | |
|---|---|---|---|---|
| 6,122,961 A | * | 9/2000 | Geen ................ | G01C 19/5719 73/504.12 |
| 6,705,164 B2 | | 3/2004 | Willig | |
| 6,892,575 B2 | * | 5/2005 | Nasiri ............... | G01C 19/5712 73/504.12 |
| 6,939,473 B2 | * | 9/2005 | Nasiri ............... | G01C 19/5719 216/2 |
| 7,036,372 B2 | * | 5/2006 | Chojnacki ......... | G01C 19/5719 73/504.12 |
| 7,316,161 B2 | | 1/2008 | Willig | |
| 7,340,954 B2 | | 3/2008 | Handrich | |
| 7,458,263 B2 | * | 12/2008 | Nasiri ................ | G01C 19/56 73/493 |

(Continued)

FOREIGN PATENT DOCUMENTS

| | | |
|---|---|---|
| CN | 101957200 A | 1/2011 |
| CN | 2012800450676 | 12/2011 |

(Continued)

*Primary Examiner* — Tran M. Tran
(74) *Attorney, Agent, or Firm* — Haley Guiliano LLP; Joshua Van Hoven (57) ABSTRACT

A gyroscope includes drive portions, lever arms, and proof masses located in a device plane. The lever arms are caused to rotate about an anchoring point based on anti-phase movement of the drive portions along a first axis in the device plane, and are coupled to the proof masses to cause the proof masses to move in anti-phase along an axis perpendicular to the first axis in the device plane. In response to a Coriolis force applied to the proof masses, the lever arm rotates out of plane and the proof masses move relative to sense electrodes. The movement of the proof masses with respect to the sense electrodes is used to measure angular velocity.

21 Claims, 6 Drawing Sheets

(56) References Cited

U.S. PATENT DOCUMENTS

| | | | |
|---|---|---|---|
| 8,061,201 B2 * | 11/2011 | Ayazi | G01C 19/5719 73/504.12 |
| 8,141,424 B2 * | 3/2012 | Seeger | G01C 19/5719 73/504.12 |
| 8,322,213 B2 | 12/2012 | Trusov | |
| 8,342,023 B2 | 1/2013 | Geiger | |
| 8,539,835 B2 * | 9/2013 | Seeger | G01C 19/5719 73/504.12 |
| 8,616,057 B1 * | 12/2013 | Mao | G01C 19/574 73/504.14 |
| 8,621,927 B2 | 1/2014 | Mao | |
| 8,677,821 B2 * | 3/2014 | Ayazi | G01C 19/5719 73/504.12 |
| 8,683,863 B2 | 4/2014 | Classen | |
| 8,739,627 B2 | 6/2014 | Li | |
| 8,833,162 B2 | 9/2014 | Seeger | |
| 8,844,357 B2 | 9/2014 | Scheben | |
| 8,915,137 B2 | 12/2014 | Classen | |
| 8,973,439 B1 | 3/2015 | Baldasarre | |
| 8,997,569 B2 | 4/2015 | Narita | |
| 9,074,890 B2 | 7/2015 | Gunthner | |
| 9,097,524 B2 | 8/2015 | Seeger | |
| 9,170,107 B2 | 10/2015 | Anac | |
| 9,219,169 B2 * | 12/2015 | Jomori | G01C 19/5747 |
| 9,274,136 B2 * | 3/2016 | Trusov | G01C 19/5783 |
| 9,329,041 B2 | 5/2016 | Katsumata | |
| 9,476,897 B2 | 10/2016 | Jomori | |
| 9,519,004 B2 | 12/2016 | Jeanroy | |
| 9,689,677 B2 | 6/2017 | Shao | |
| 9,863,769 B2 * | 1/2018 | Anac | G01C 19/5712 |
| 9,927,241 B2 | 3/2018 | Piirainen | |
| 9,958,271 B2 | 5/2018 | Anac | |
| 9,989,553 B2 | 6/2018 | Waters | |
| 9,995,583 B2 | 6/2018 | Rocchi | |
| 10,030,977 B2 | 7/2018 | Hattass | |
| 10,139,228 B2 | 11/2018 | Piirainen | |
| 10,209,070 B2 | 2/2019 | Geisberger | |
| 10,696,541 B2 * | 6/2020 | Endean | G01C 19/5747 |
| 10,767,993 B2 * | 9/2020 | Kato | G01C 19/5769 |
| 10,914,584 B2 * | 2/2021 | Senkal | G01C 19/5762 |
| 11,105,630 B2 * | 8/2021 | Kuisma | G01C 19/5712 |
| 11,209,271 B2 * | 12/2021 | Blomqvist | G01C 19/5712 |
| 2010/0071467 A1 * | 3/2010 | Nasiri | G01C 19/5719 73/504.12 |
| 2010/0116050 A1 | 5/2010 | Geiger | |
| 2010/0222998 A1 * | 9/2010 | Blomqvist | G01C 19/5747 701/532 |
| 2010/0313657 A1 | 12/2010 | Trusov | |
| 2012/0013355 A1 | 1/2012 | Narita | |
| 2013/0068018 A1 * | 3/2013 | Seeger | G01C 19/5755 73/504.12 |
| 2013/0192365 A1 * | 8/2013 | Zhuang | G01C 19/5733 73/504.12 |
| 2013/0233048 A1 * | 9/2013 | Anac | G01C 19/56 73/1.77 |
| 2015/0114112 A1 | 4/2015 | Valzasina | |
| 2015/0211853 A1 | 7/2015 | Anac | |
| 2015/0330783 A1 | 11/2015 | Rocchi | |
| 2016/0231115 A1 | 8/2016 | Piirainen | |
| 2018/0231381 A1 | 8/2018 | Lassi | |

FOREIGN PATENT DOCUMENTS

| | | |
|---|---|---|
| CN | 104515517 A | 4/2015 |
| KR | 10-2014-009829 | 4/2014 |
| NO | 2013039824 | 3/2013 |
| WO | WO2017003148 | 1/2017 |

* cited by examiner

OUT-OF-PLANE SENSING GYROSCOPE ROBUST TO EXTERNAL ACCELERATION AND ROTATION

CROSS REFERENCE TO RELATED APPLICATIONS

This application is a continuation of U.S. patent application Ser. No. 15/479,079, filed Apr. 4, 2017, the disclosure of which is hereby incorporated by reference herein in its entirety.

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

Many sensors such as accelerometers, gyroscopes, pressure sensors, and microphones are implemented as microelectromechanical systems (MEMS) sensors. Micromechanical components of the sensor are fashioned using silicon fabrication techniques, and those micromechanical components respond (e.g., move) in response to certain external stimuli that are measured by the sensor, based on the design of the particular micromechanical components. The response of the micromechanical component to the external stimuli may be measured, e.g., by measuring the relative distance between the moving micromechanical components and fixed components of the sensor.

In the case of a MEMS gyroscope, certain micromechanical components are caused to vibrate at a drive frequency. A number of components are often physically connected by numerous springs, each of which is designed to enable motion in certain directions while restricting movement in other directions. When a mass that is vibrating at the drive frequency experiences a Coriolis force along an axis that is perpendicular to the drive axis as a result of rotation, it will move along this Coriolis axis (e.g., a "sense" or "Coriolis" axis) if springs or other structural features do not prevent such a motion. This Coriolis force is proportional to the angular velocity of the rotation. This motion may then be sensed based on the motion of the mass (or in some applications, an additional proof mass connected by the additional springs) in the sense direction, e.g., based on the relative distance between the moving sense mass and fixed components of the gyroscope.

A MEMS gyroscope is implemented in devices that may experience numerous other forces in addition to angular velocity. For example, the gyroscope may also experience forces due to linear acceleration and angular acceleration. These forces may be imparted on the components of the MEMS gyroscope such as the drive and proof masses, resulting in movements that are improperly interpreted as resulting from a Coriolis force or modifying the movement due to the Coriolis force.

SUMMARY OF THE INVENTION

In an embodiment of the present disclosure, an exemplary gyroscope comprises two first drive portions that move in a first anti-phase drive motion, two first lever arms, and two first drive decouplings, wherein each of the two first drive decouplings couples one of the first drive portions to one of the first lever arms, and wherein the two first lever arms rotate in response to the first anti-phase drive motion. The gyroscope also comprises two first proof masses and four first proof mass couplings, wherein two of the first proof mass couplings couple one of the two first lever arms to each of the two first proof masses, wherein another two of the first proof mass couplings couple the other of the two first lever arms to each of the two first proof masses, and wherein the two first proof masses move in anti-phase in response to the first anti-phase drive motion. The gyroscope also comprises two second drive portions that move in a second anti-phase drive motion, two second lever arms, and two second drive decouplings, wherein each of the two second driving decouplings couples one of the second drive portions to one of the second lever arms, and wherein the two second lever arms rotate in response to the second anti-phase drive motion. The gyroscope also comprises two second proof masses and four second proof mass couplings, wherein two of the second proof mass couplings couple one of the second lever arms to each of the two second proof masses, wherein another two of the second proof mass couplings couple the other of the two second lever arms to each of the two second proof masses, and wherein the two second proof masses move in anti-phase in response to the second anti-phase drive motion.

In an embodiment of the present disclosure, an exemplary gyroscope comprises two drive portions located in a device plane, wherein the two drive portions are decoupled and move in an anti-phase drive motion along a first axis, two lever arms located in the device plane, and two drive decouplings located in the device plane, wherein each of the two first drive decouplings couples one of the drive portions to one of the lever arms, and wherein the two lever arms rotate in the device plane response to the anti-phase drive motion. The gyroscope also comprises two proof masses located in the device plane and four proof mass couplings located in the device plane, wherein two of the proof mass couplings couple one of the two lever arms to each of the two first proof masses, wherein another two of the proof mass couplings couple the other of the two lever arms to each of the two proof masses, wherein the two first proof masses move in anti-phase in the device plane along a second axis perpendicular to the first axis in response to the first anti-phase drive motion. The gyroscope also comprises one or more sense electrodes located in a plane parallel to the device plane, wherein in response to a rotation about a measured axis the two lever arms rotate out of the device plane about the drive decouplings, wherein in response to the rotation the two proof masses move out of the device plane relative to the one or more sense electrodes, and wherein angular velocity is determined based on the movement of the two proof masses relative to the one or more sense electrodes.

In an embodiment of the present disclosure, an exemplary gyroscope comprises two drive portions located in a device plane, wherein the two drive portions are decoupled and move in an anti-phase drive motion, and two lever arms located in the device plane, wherein each of the lever arms is coupled to one of the two drive portions, and wherein the two lever arms rotate in the device plane response to the anti-phase drive motion. The gyroscope also comprises two proof masses located in the device plane and four proof mass couplings located in the device plane, wherein two of the proof mass couplings couple one of the two lever arms to each of the two first proof masses, wherein another two of the proof mass couplings couple the other of the two lever arms to each of the two proof masses, wherein the two first proof masses move in anti-phase in the device plane in response to the first anti-phase drive motion. The gyroscope also comprises one or more sense electrodes located in a plane parallel to the device plane, wherein in response to a rotation about a measured axis the two lever arms rotate out of the device plane in an axis perpendicular to the measured axis, wherein in response to the rotation the two proof masses move out of the device plane relative to the one or more sense electrodes, wherein a linear acceleration out of the device plane does not result in a differential movement of the two proof masses, and wherein angular velocity is determined based on the movement of the two proof masses relative to the one or more sense electrodes.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A gyroscope may be fabricated as a MEMS gyroscope having a MEMS layer and a substrate layer. The MEMS layer includes a movable spring-mass system that may be suspended over the substrate layer, for example, from anchors or a frame that extend from the substrate layer into the MEMS layer, and to which the spring-mass system of the MEMS layer is attached. In an exemplary gyroscope, the MEMS layer may be located in an x-y plane which may be perpendicular to a z-axis. A drive system such as complementary drive combs attached to anchors and to the spring-mass system may cause the spring-mass system to move based on the configuration of the various components of the spring-mass system and their relative positioning and configuration.

A proof mass system of the gyroscope may include proof masses that are coupled and designed to move perpendicular to the drive direction of the proof mass and to an axis of rotation about which angular velocity is sensed by the gyroscope in response to the Coriolis force. For an exemplary gyroscope that is driven in the x-y plane and that senses angular velocity about one of the x-axis or y-axis (e.g., depending on the relative positioning of the gyroscope with respect to the x-axis and y-axis in the x-y plane), the proof masses may move perpendicular to the x-y plane along the z-axis in response to a Coriolis force caused by rotation about the sensed axis.

The spring-mass system may be designed such that the gyroscope is robust (e.g., the sense response of the gyroscope to rotation about the sensed axis is not substantially modified) in response to external forces such as linear acceleration in any direction, angular velocity about axes other than the axis that is being sensed, or angular acceleration. The drive mode and/or the sense mode of the gyroscope may be balanced, such that the neither mode exerts linear or angular torque on the gyroscope components or anchors. In this manner, the energy generated by the drive and sense modes are not transferred (e.g., do not leak) to the anchors, thus enabling a high resonator quality factor. The balanced drive and sense modes may also prevent coupling of external linear or angular forces (i.e., other than the desired drive motion and sense response to the measured angular velocity) to the spring-mass system.

In an embodiment, the drive structure is decoupled from the sense mode, such that the drive system (e.g., drive combs) do not move in the sense mode. Moreover, common mode and differential mode of the sensor may be strongly coupled, which may result in a frequency difference between the common mode and differential mode that is significantly greater than the differential mode frequency divided by the quality factor. This strong coupling may compensate for variations in manufacturing or other processes, resulting in balanced operation of the drive and sense modes despite such variations. An exemplary gyroscope may have the drive and sense modes configured such that the frequencies associated with these modes are among the lower operational modes for the system, which may further limit vibrations or other external forces from coupling to the operational modes of the system.

In an embodiment, a plurality of drive masses are driven in anti-phase. Each drive mass is part of a drive system, which may include additional components to transmit the drive motion of the drive masses to the proof masses of a proof mass system. In an embodiment, each drive mass may be coupled to the proof masses by one or more drive decoupling springs, which decouple the drive masses with respect to each other and the other components of the spring mass system. One or more components such as lever arms may be coupled to the drive decoupling springs, in order to transfer the drive motion to cause the desired movement of the proof masses. In response to a Coriolis force caused by rotation about the measured axis, the proof masses and lever arms may respond by moving out of the x-y plane. One or more of the proof masses may further be coupled to another proof mass to maintain robust and coupled operation of the gyroscope.

Figure 1:
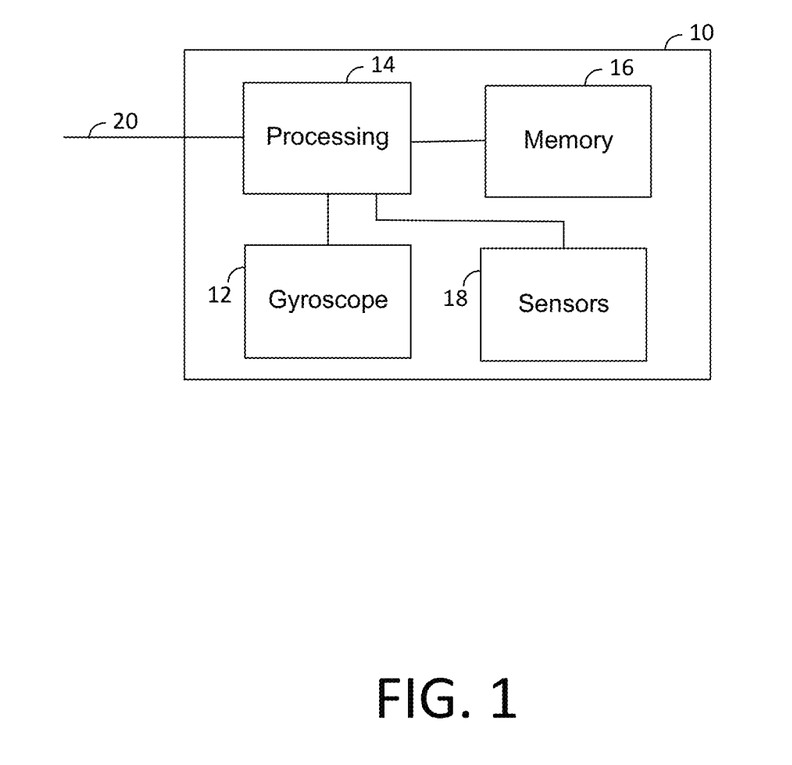
FIG. 1 shows an illustrative motion processing system in accordance with an embodiment of the present disclosure.

FIG. 1 depicts an exemplary motion processing system 10 in accordance with some embodiments of the present disclosure. Although particular components are depicted in FIG. 1, it will be understood that any suitable combination of sensors, processing components, memory, and other circuitry may be utilized as necessary for different applications and systems. In an embodiment as described herein, the motion processing system may include at least a MEMS gyroscope 12 and supporting circuitry, such as processing circuitry 14 and memory 16. In some embodiments, one or more additional sensors 18 (e.g., additional MEMS gyroscopes, MEMS accelerometers, MEMS microphones, MEMS pressure sensors, and a compass) may be included within the motion processing system 10 to provide an integrated motion processing unit ("MPU") (e.g., including 3 axes of MEMS gyroscope sensing, 3 axes of MEMS accelerometer sensing, microphone, pressure sensor, and compass).

Processing circuitry 14 may include one or more components providing necessary processing based on the requirements of the motion processing system 10. In some embodiments, processing circuitry 14 may include hardware control logic that may be integrated within a chip of a sensor (e.g., on a substrate or cap of a MEMS gyroscope, or on an adjacent portion of a chip to the gyroscope) such as the gyroscope 12 to control the operation of the gyroscope 12 and perform aspects of processing for the gyroscope 12. In some embodiments, the gyroscope 12 may include one or more registers that allow aspects of the operation of hardware control logic to be modified (e.g., by modifying a value of a register). Other sensors 18 may operate in a similar manner. In some embodiments, processing circuitry 14 may also include a processor such as a microprocessor that executes software instructions, e.g., that are stored in memory 16. The microprocessor may control the operation of the gyroscope 12 by interacting with the hardware control logic, and process measurement signals received from gyroscope 12. The microprocessor may interact with other sensors in a similar manner.

Although in some embodiments (not depicted in FIG. 1), the gyroscope 12 or other sensors 18 may communicate directly with external circuitry (e.g., via a serial bus or direct connection to sensor outputs and control inputs), in an embodiment the processing circuitry 14 may process data received from the gyroscope 12 and other sensors 18 and communicate with external components via a communication interface 20 (e.g., a SPI or I2C bus, or in automotive applications, a controller area network (CAN) or Local Interconnect Network (LIN) bus). The processing circuitry 14 may convert signals received from the gyroscope 12 and other sensors 18 into appropriate measurement units (e.g., based on settings provided by other computing units communicating over the communication bus 20) and perform more complex processing to determine measurements such as orientation or Euler angles, and in some embodiments, to determine from sensor data whether a particular activity (e.g., walking, running, braking, skidding, rolling, etc.) is taking place.

In some embodiments, certain types of information may be determined based on data from multiple gyroscopes 12 and sensors 18, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

A MEMS gyroscope may typically have a plurality of micromechanical components that are used in order to measure rotation about an axis (e.g., pitch, roll, and/or yaw). The micromechanical components may include a plurality of masses, combs, electrodes, levers, arms, springs, and other similar components, situated in a MEMS device plane of the gyroscope (e.g., as a suspended spring-mass system). One or more of the micromechanical components are caused to vibrate, typically through an electrostatic drive system such as drive electrodes or drive combs. The components (e.g., a drive mass) are caused to vibrate at a drive frequency in a drive axis. Although it may be possible to measure rotation from the drive mass, in many gyroscopes a number of masses (e.g., Coriolis masses, proof masses, sense masses, etc.) are coupled to each other by springs and masses (e.g., lever arms, coupling masses, etc.) which often restrict the freedom of motion of the masses in certain directions based on the spring design (e.g., spring rigidity, torsion spring, etc.) and placement.

In an embodiment, a proof mass may be caused to move along a sense drive axis by the drive motion. The design of the springs and masses of the suspended spring-mass system may be configured such that the proof mass and other components are restricted to moving primarily in only certain directions. A drive mass may be restricted to move primarily along a drive axis within the MEMS device plane. In an exemplary embodiment of a roll or pitch sensor in which the proof mass is driven that moves within the MEMS device plane along the sense drive axis, the proof mass and other components coupled thereto (e.g., a lever arm as described herein) may move out of plane in response to rotation about the measured axis (e.g., in response to a Coriolis force that is perpendicular to both the measured axis and sense drive axis, in response to rotation about the measured axis). Whether the proof masses respond to rotation about the roll axis/x-axis (i.e., measured axis is the x-axis) or the pitch axis/y-axis (i.e., measured axis is the y-axis) depends on the sensor design and the orientation of the sensor relative to the x and y axes.

Sensing elements such as sense electrodes may be located in a plane that is parallel to the MEMS device plane, such as on the surface of a substrate formed by an underlying CMOS substrate layer of the gyroscope. Each proof mass and its respective sense electrode may form a capacitor, the capacitance of which varies based on the relative distance between each proof mass and its associated sense electrode. In a suspended spring-mass system in which a plurality of proof masses move differentially with respect to the sense electrodes (e.g., each proof mass is associated with one or more other proof masses that move in the opposite direction relative to the sense electrodes in response to a Coriolis force), one of the proof masses will be moving closer to its associated electrode (resulting in an increase in capacitance) while a differential proof mass will be moving away from its associated electrode (resulting in a decrease in capacitance). Signals representative of the capacitances may be compared and analyzed to determine angular velocity about the measured rotational axis, based on known scaling factors between angular velocity and the measured differential capacitance.

Under conditions where there is no angular velocity about the measured rotational axis, the proof masses should not move with respect to the sense electrodes, such that the capacitance values associated with each proof mass / sense electrode pair are not changing and are substantially identical. Accordingly, an exemplary gyroscope as described herein may have a spring/mass configuration, decoupled drive, and coupled sense mode such that the proof masses are not responsive to external forces such as angular velocity about axes other than the measured rotational axis, linear acceleration, or angular acceleration. Similarly, a gyroscope as described herein may prevent coupling of such external forces to the movement of the proof masses in response to a Coriolis force, e.g., such that the external forces are not coupled to the out-of-plane motion that is used to measure angular velocity about the measured rotational axis.

In this manner, the motion of the masses of an exemplary roll-rate or pitch-rate sensor (e.g., roll or pitch based on sensor orientation) may be balanced with respect to external linear accelerations and angular accelerations, such that the effects of the external accelerations and angular accelerations are not manifested in the movements of the proof masses. In exemplary embodiments the balance of the gyroscope design may be obtained based on a drive motion of the drive masses, coupling between the drive masses, coupling between the proof masses, or any suitable combination thereof. The exemplary gyroscope designs provided herein may not exert linear or angular torque in either of the drive or sense modes. As a result, energy may not leak through the anchors, which may enable resonator quality factors that doe no depend on die attachment.

Figure 2:
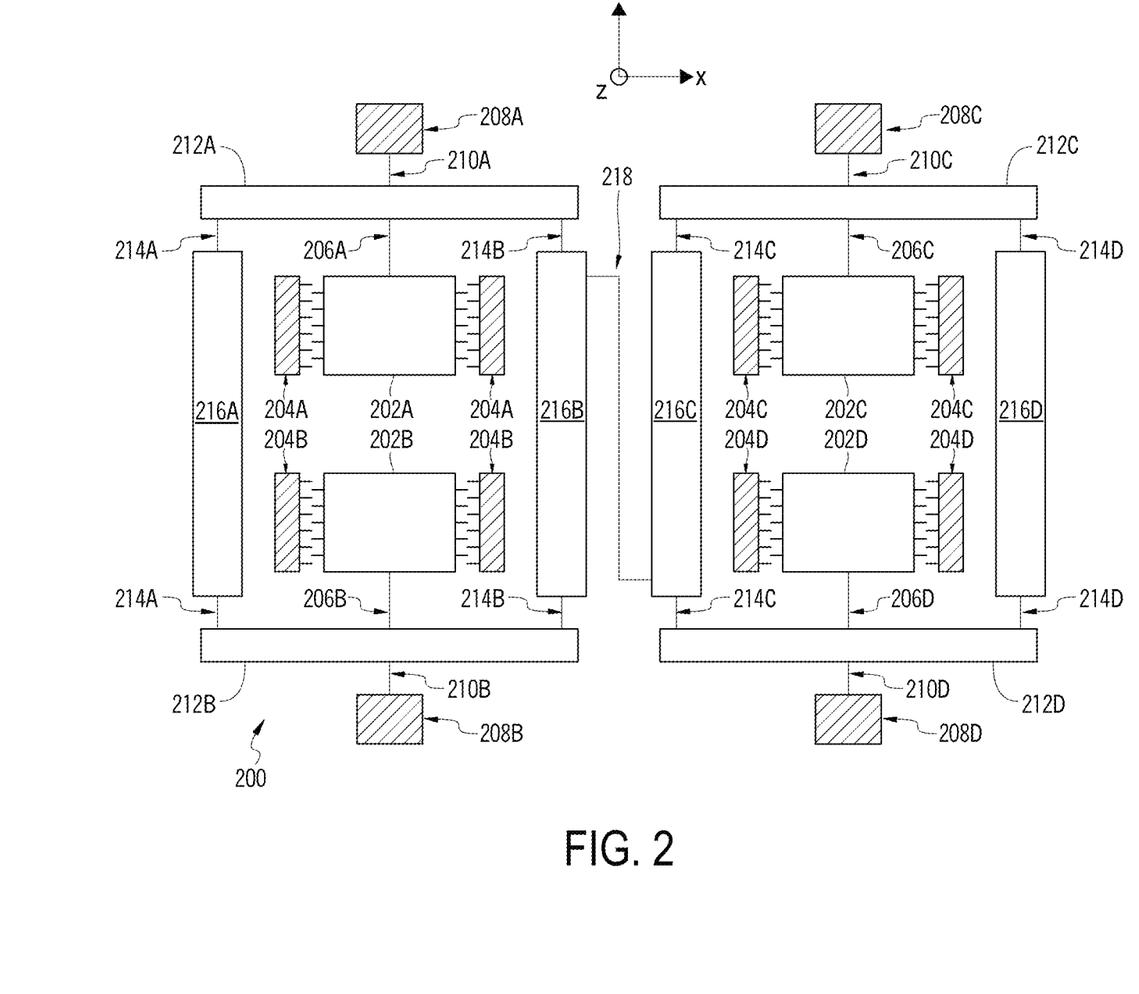
FIG. 2 shows an illustrative gyroscope design in accordance with an embodiment of the present disclosure.

FIG. 2 shows an illustrative gyroscope design in accordance with an embodiment of the present disclosure. Although the gyroscope of FIG. 2 may include any suitable components, in an exemplary embodiment the gyroscope of FIG. 2 may include drive masses 202a, 202b, 202c, and 202d; lever arms 212a, 212b, 212c, and 212d; proof masses 216a, 216b, 216c, and 216d, and a number of anchors, springs, and actuators as described herein. Each of these components may be located (e.g., suspended) within a MEMS device plane that defines an x-axis and y-axis in the plane, and a z-axis perpendicular to the plane. A substrate may be located in a plane that is parallel to the MEMS device plane (e.g., below the MEMS device plane), and in some embodiments, may include sensing elements (e.g., electrostatic sense electrodes, not depicted in FIG. 2) CMOS circuitry within the substrate layer, and a variety of anchored components that extend from the substrate into the MEMS device plane, to provide anchors, actuators, sense electrodes, and/or other components for suspending and operating the MEMS gyroscope.

Each of the drive masses 202a, 202b, 202c, and 202d may have a respective drive motion imparted on the drive mass in a respective drive direction, as described herein. Although any suitable actuation method may be used in accordance with the present disclosure, in an embodiment the drive masses may be caused to move in the drive direction by respective electrostatic actuators 204a, 204b, 204c, and 204d. In the exemplary embodiment depicted in FIG. 2, the electrostatic actuators 204a, 204b, 204c, and 204d may anchored to the substrate and extend therefrom into the MEMS device plane. The electrostatic actuators may be located relative to the drive masses in a manner such that drive masses (which are movable within the MEMS device plane) are caused to oscillate with the MEMS device plane in a drive direction along a drive axis. Although any suitable electrostatic actuation may be used in accordance with the present disclosure, in an embodiment each drive mass and its associated actuators may form a comb drive, with interdigitated comb fingers extending from each drive mass and its associated actuators. Although not depicted in FIG. 2, drive masses 202a, 202b, 202c, and 202d may be each be suspended from respective anchors by springs, which are compliant along a drive axis (e.g., the x-axis) and rigid along other axes, in order to facilitate movement of the drive masses along the drive axis.

Each of the drive masses may be coupled to a respective lever arm via a drive decoupling (e.g., such that drive mass 202a is coupled to lever arm 212a via drive decoupling 206a, drive mass 202b is coupled to lever arm 212b via drive decoupling 206b, drive mass 202c is coupled to lever arm 212c via drive decoupling 206c, and drive mass 202d is coupled to lever arm 212d via drive decoupling 206d). In an embodiment, each drive decoupling may comprise one or more springs and/or masses that are coupled and configured such that the drive motion of the drive masses is decoupled from a sense motion as described herein. Although the drive decouplings may perform this function in a variety of manners, in an embodiment the drive decoupling may be a spring that is torsionally compliant to allow movement of the lever arm and proof masses out of the MEMS device plane (e.g., in the z-axis direction) in response to a Coriolis force due to rotation about the measured axis (e.g., the x-axis). In an embodiment, although the spring may be partially compliant along the drive axis, the spring may have sufficient width (e.g., along the x-axis axis) such that each lever arm is pulled along the drive axis in response to the respective motion of its associated drive mass.

In an embodiment, each of the lever arms may translate the drive motion applied along a first axis (e.g., the x-axis in FIG. 2) to a sense drive motion along a perpendicular axis, by being anchored and suspended in a manner that results in an in-plane rotation within the MEMS device plane. Although a suitable lever arm can include multiple interconnected masses and springs suspended in a suitable manner to translate the drive motion to a perpendicular sense drive motion, in an embodiment each lever arm may be suspended from a respective anchor by a spring located at the approximate center of the lever arm and along a shared axis with the drive decoupling spring when the gyroscope is not being driven (e.g. as depicted in FIG. 2). Thus, suspension spring 210a may share an axis with drive decoupling spring 206a and suspend lever arm 212a from anchor 208a, suspension spring 210b may share an axis with drive decoupling spring 206b and suspend lever arm 212b from anchor 208b, suspension spring 210c may share an axis with drive decoupling spring 206c and suspend lever arm 212c from anchor 208c, and suspension spring 210d may share an axis with drive decoupling spring 206d and suspend lever arm 212d from anchor 208d. As described herein, the respective coupling of the lever arms to both the drive decoupling springs and the anchors (via the suspension springs) may result in each lever arm rotating about its anchor in the MEMS device plane in response to a drive motion imparted by the drive masses via the drive decoupling springs. The rotation of each lever arm about each respective anchor may result in a motion at the end of each lever arm that is along the y-axis in the MEMS device plane.

Each lever arm may be coupled to one or more proof masses via one or more couplings. In an embodiment, each lever arm may be coupled to a proof mass at each end of the lever arm, such that in the embodiment of FIG. 2 lever arm 212a is coupled to proof mass 216a via proof mass spring 214a and to proof mass 216b via proof mass spring 214b, lever arm 212b is coupled to proof mass 216a via proof mass spring 214a and to proof mass 216b via proof mass spring 214b, lever arm 212c is coupled to proof mass 216c via proof mass spring 214c and to proof mass 216d via proof mass spring 214d, and lever arm 212d is coupled to proof mass 216c via proof mass spring 214c and to proof mass 216d via proof mass spring 214d. While each drive motion from each drive mass may be decoupled from the other drive masses, in an embodiment the drive motions may be coordinated such that the lever arms collectively cause each proof mass to move in the positive or negative y-direction, based on whether each pair of lever arms coupled to each proof mass are collectively rotating in a clockwise or counter-clockwise manner. The drive masses may be driven in anti-phase at a drive frequency, such that the lever arms and proof masses are driven to oscillate (rotationally for the lever arms, linearly for the proof masses) at the drive frequency.

As the proof masses are driven along the y-axis, they may experience a Coriolis force as the result of a rotation about an axis that is perpendicular to the sense drive axis and in which movement of the proof masses is permitted by the gyroscope construction in configuration. In the exemplary gyroscope design of FIG. 2, the proof masses may experience an out-of-plane Coriolis force (e.g., along the z-axis) in response to a rotation about the measured axis (e.g., the x-axis), with the direction of the Coriolis force based on the direction of the sense drive motion (e.g., the y-axis) and the direction of rotation about the measured axis (e.g., the x-axis). The movement of the proof masses out of the MEMS device plane may be sensed in any suitable manner, such as electrostatic, piezoelectric, or optical sensing. In an exemplary embodiment of electrostatic sensing, one or more sense electrodes may be located in parallel to the proof masses (e.g., on the substrate below the proof masses) to form a capacitor with the proof masses, the capacitance of which changes based on the relative distance between each proof mass and its associated sense electrodes. In the exemplary embodiment of FIG. 2, the changes in capacitance may be sensed differentially. As described herein, based on the drive mode and configuration of the exemplary gyroscope described herein, a movement of one or more masses out-of-plane away from the substrate may correspond to a movement of another of the one or more proof masses out-of-plane towards the substrate.

The exemplary gyroscope of FIG. 2 may include two similar gyroscope portions, each including an identical number and configuration of drive masses, lever arms, and proof masses. Although two drive masses, lever arms, and proof masses are depicted in FIG. 2, it will be understood that other numbers and configurations of proof masses may be possible in other embodiments. In the exemplary embodiment of FIG. 2, each gyroscope portion includes a respective drive system (e.g., including two drive masses, two drive decoupling springs, two lever arms, and two suspension springs) and a respective sense system (e.g., including two sense springs and two proof masses). A coupling spring 218 may couple the two gyroscope portions together, such that the drive sense motion and Coriolis response of the gyroscope portions are coupled, despite the decoupling of the drive motion of the drive masses from each other, and the decoupling of the drive motion from the sense drive motion and Coriolis response.

Figure 3:
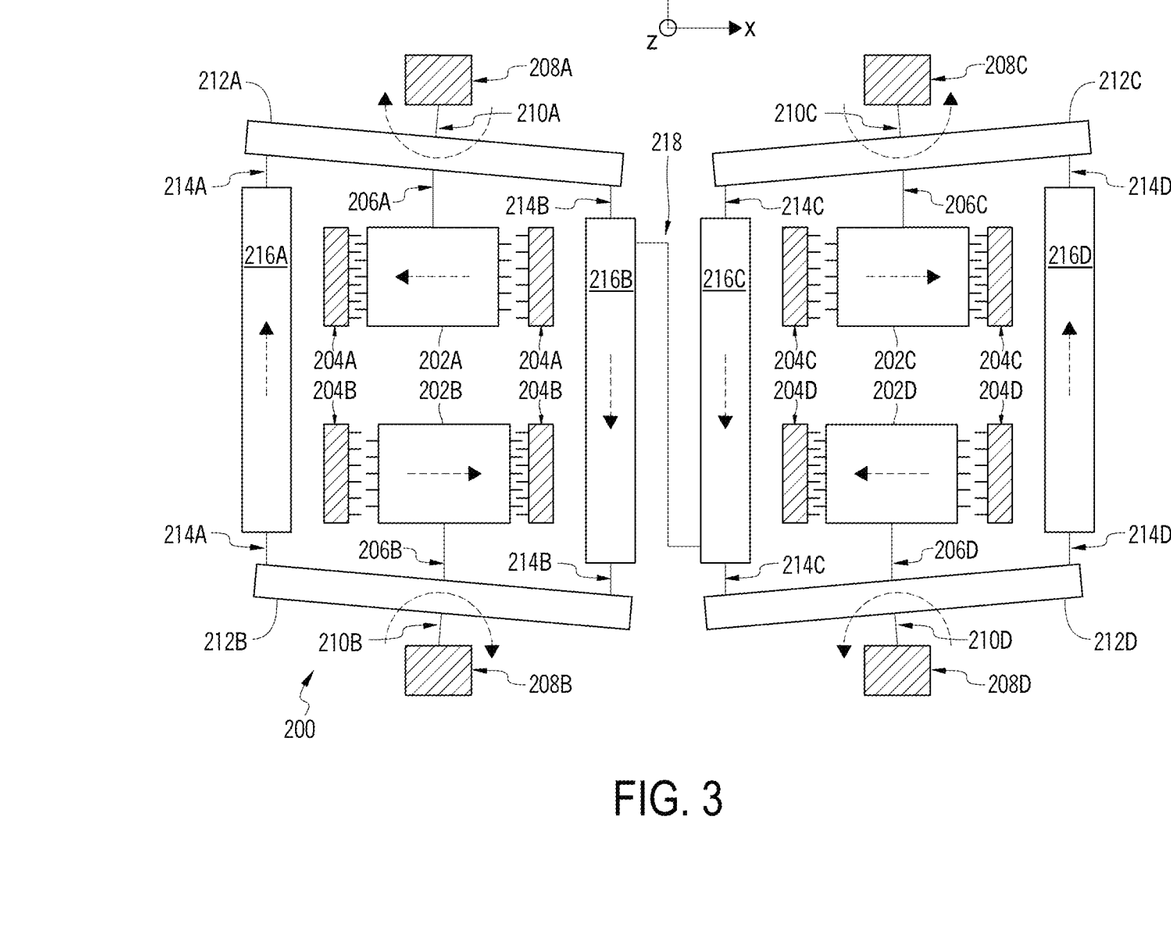
FIG. 3 shows an illustrative diagram depicting a response of the gyroscope of FIG. 2 in response to a drive motion in accordance with an embodiment of the present disclosure.

FIG. 3 shows an illustrative diagram depicting a response of the gyroscope of FIG. 2 in response to a drive motion in accordance with an embodiment of the present disclosure. FIG. 3 depicts the drive motion of the gyroscope of FIG. 2 in a first of two anti-phase drive modes, which are applied at the drive frequency. In an embodiment, the respective drive masses of each drive system may be driven in anti-phase, such that when certain of the drive masses are moving a given distance in the positive x-direction (e.g., drive mass 202*b* and 202*c* for the motion depicted in FIG. 2), the other drive masses are moving the given distance in the negative y-direction (e.g., drive mass 202*a* and 202*d*). Further, the actuation of the drive masses of the respective drive systems may be coordinated such that the drive motion results in a similar motion of respective lever arms and proof masses (e.g., such that proof masses 216*a* and 216*d* move in the same direction and distance along the y-axis, and such proof masses 216*b* and 216*c* move in the same direction and distance along the y-axis). While the motion of each of the drive masses may be decoupled, coupling in the sense mode may be maintained based on the collective coupling of proof masses by respective lever arms (e.g., the motion of proof masses 216*a* and 216*b* coupled by movement of lever arms 212*a* and 212*b* and the motion of proof masses 216*c* and 216*d* coupled by movement of lever arms 212*c* and 212*d*) and the coupling between the gyroscope portions by coupling spring 218 between proof masses 216*b* and 216*c*.

In the embodiment of FIG. 3, when drive mass 202*a* is caused to move in the negative x-direction by actuators 204*a*, drive mass 202*b* is caused to move in the positive x-direction by actuators 204*b*, drive mass 202*c* is caused to move in the positive x-direction by actuators 204*c*, and drive mass 202*d* is caused to move in the negative x-direction by actuators 204*d*. During other portions of the anti-phase drive motion at the drive frequency, each mass will move in the opposite direction. The drive motion depicted in FIG. 3 causes lever arms 212*a* and 212*b* to rotate in a clockwise fashion about respective anchors 208*a* and 208*b*, and causes lever arms 212*c* and 212*d* to rotate in a counter-clockwise fashion about respective anchors 208*c* and 208*d*. Rotation of the lever arms will be in the opposite direction about the respective anchors (e.g., counter-clockwise rotation of lever arms 212*a* and 212*b* and clockwise rotation of lever arms 212*c* and 212*d*) in response to the opposite drive motion from that depicted in FIG. 3. As depicted in FIG. 3, the clockwise rotation of lever arm 212*a* pulls proof mass 216*a* in the positive y-direction and pushes proof mass 216*b* in the negative y-direction, the clockwise rotation of lever arm 212*b* pushes proof mass 216*a* in the positive y-direction and pulls proof mass 216*b* in the negative y-direction, the counter-clockwise rotation of lever arm 212*c* pushes proof mass 216*c* in the negative y-direction and pulls proof mass 216*d* in the positive y-direction, and the counter-clockwise rotation of lever arm 212*d* pulls proof mass 216*c* in the negative y-direction and pushes proof mass 216*d* in the positive y-direction. The opposite direction of the drive motion of the drive masses will result in an opposite-direction movement of the proof masses. The sense drive motion of each of the proof masses of each gyroscope portion are coupled by the couplings to the lever arms, and the sense drive movements between the gyroscope portions are coupled by the coupling spring 118.

Figure 4A:
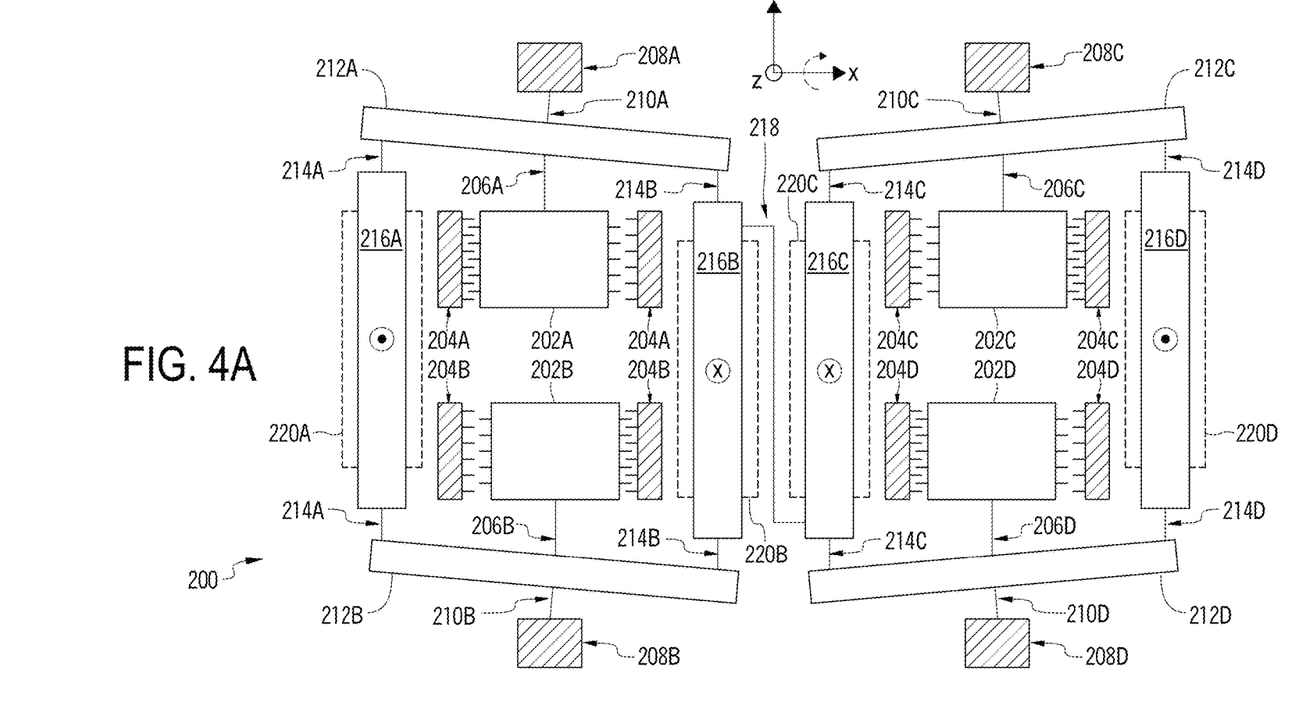
FIG. 4A shows an illustrative diagram depicting a top view of an out-of-plane sense response of the gyroscope of FIG. 2 in response to an angular velocity about the roll axis in accordance with an embodiment of the present disclosure.
Figure 4B:
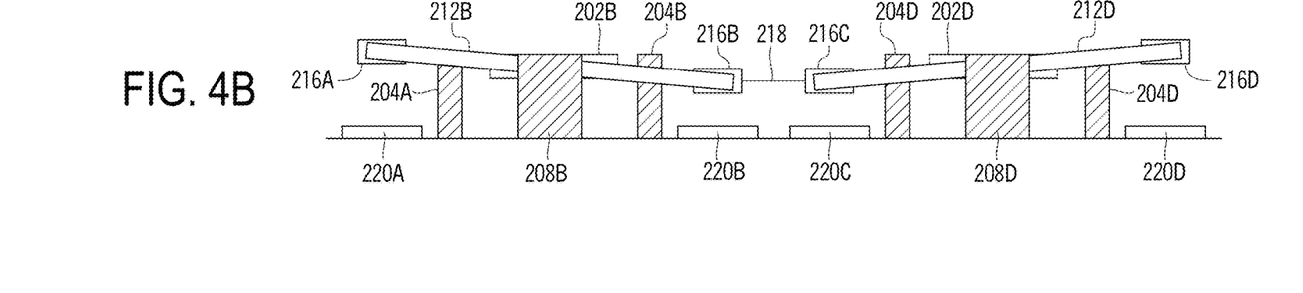
FIG. 4B shows an illustrative diagram depicting a perspective view of an out-of-plane sense response of the gyroscope of FIG. 2 in response to an angular velocity about the roll axis in accordance with an embodiment of the present disclosure.

FIG. 4A shows an illustrative diagram depicting a top view of an out-of-plane sense response of the gyroscope of FIG. 2 in response to an angular velocity about the roll axis in accordance with an embodiment of the present disclosure, while FIG. 4B shows an illustrative diagram depicting a perspective view of an out-of-plane sense response of the gyroscope of FIG. 2 in response to an angular velocity about the roll axis in accordance with an embodiment of the present disclosure. In the exemplary embodiment of FIGS. 4A and 4B, the depicted movement is based on the drive and sense drive motion depicted in FIG. 3.

FIGS. 4A and 4B depict sense electrodes 220*a*, 220*b*, 220*c*, and 220*d*, each associated with a respective one of proof masses 216*a*, 216*b*, 216*c*, and 216*d*. As is depicted about the x-axis of FIG. 4A, a rotation having an angular velocity is depicted about the roll axis of the gyroscope, with an axis of rotation that is perpendicular to the y-axis sense drive motion of each of the proof masses. A Coriolis force in the positive z-direction will result from the rotation and the positive y-axis sense drive motion of proof mass 216a, a Coriolis force in the negative z-direction will result from the rotation and the negative y-axis sense drive motion of proof mass 216b, a Coriolis force in the negative z-direction will result from the rotation and the negative y-axis sense drive motion of proof mass 216c, and a Coriolis force in the positive z-direction will result from the rotation and the positive y-axis sense drive motion of proof mass 216d. In response to the Coriolis force and drive mode, the proof masses are excited along the z-axis in a sense resonance mode.

As is depicted in FIG. 4B, these Coriolis forces result in rotation of the lever arms 212b and 212d (e.g., about the drive decoupling springs 206a, 206b, 206c, and 206d) and a differential movement of the proof masses relative to the sense electrodes in the sense resonance mode. Although not depicted in FIG. 4B, the Coriolis forces on the proof masses 216a and 216b will cause lever arm 212a to rotate in a similar manner to lever arm 212b, and the Coriolis forces on the proof masses 216c and 216d will cause lever arm 212c to rotate in a similar manner to lever arm 212d. The capacitance between proof mass 216a and sense electrode 220a will decrease in proportion to the increase in the capacitance between proof mass 216b and sense electrode 220b, while the capacitance between proof mass 216d and sense electrode 220d will decrease in proportion to the increase in the capacitance between proof mass 216c and sense electrode 220c. Because of the coupling between the gyroscope portions by proof mass 216b, coupling 218, and proof mass 216c, the sense modes of each of the proof mass systems of the gyroscope portions are coupled and move proportionally, further improving the accuracy of the sensed capacitances.

As is depicted in FIG. 4B, the drive masses 202a, 202b, 202c, and 202d may not respond to the Coriolis forces, based on the decoupling provided between the drive and sense motions by drive decoupling springs 206a, 206b, 206c, and 206d. In an embodiment as described herein, the drive decoupling springs may permit torsional motion of the lever arms about the y-axis, while the suspension, drive motion, and the lack of translation of the rotation of the lever arms to the drive mass (e.g., via the drive decoupling spring) prevent transfer of any non-drive motion to the lever arms and proof masses.

Both the drive mode and sense mode described and depicted in FIGS. 3, 4A, and 4B may be balanced, such that neither exerts linear or angular torque. In this manner, energy may not leak through the anchors, which may enable resonator quality factors that do not depend on die attachment. In some embodiments, this may permit use of appropriate adhesives for sensor mounting (e.g., softer adhesives) that may lessen the effects of packaging on the performance of the sensor. External forces such as linear acceleration, angular acceleration, and angular velocity (i.e., about axes other than the measured axis) may not couple to the drive masses, lever arms, or proof masses as a result of the balanced drive mode and balanced sense mode, which may result in more accurate measurement of angular velocity about the measured axis. In an embodiment, the frequency difference between the common and differential modes may be significantly greater than the differential mode frequency divided by the quality factor, such that the modes are substantially coupled. As a result, manufacturing non-idealities or component wear may have a limited impact on sensitivity to external forces.

Figure 5:
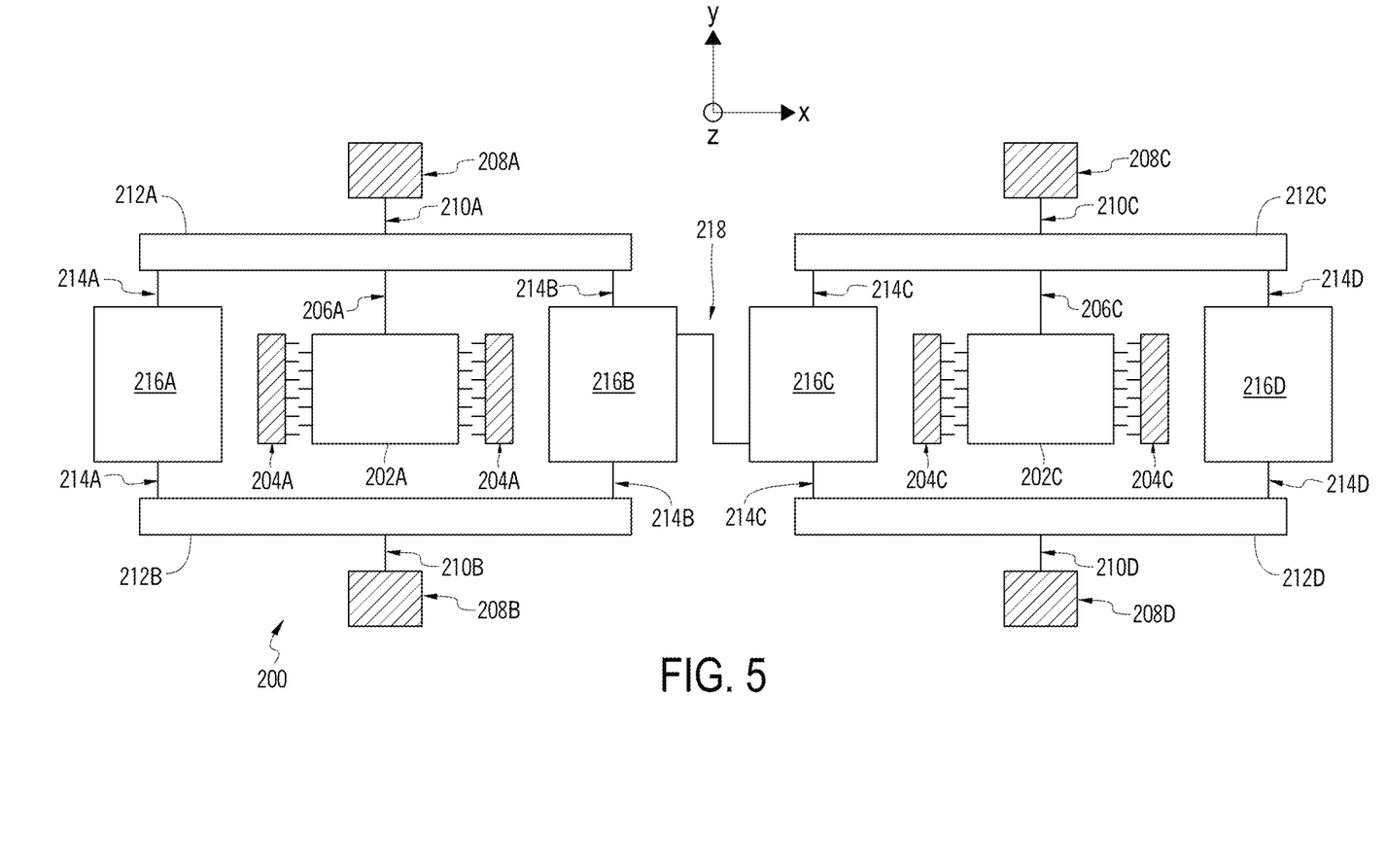
FIG. 5 shows an exemplary gyroscope design in accordance with some embodiments of the present disclosure.

FIG. 5 shows an exemplary gyroscope design in accordance with some embodiments of the present disclosure. Similar elements to those described in FIGS. 2-4 are similarly numbered in FIG. 5 and operate in a similar manner. As is depicted in FIG. 5, in an embodiment, it may not be necessary to directly impart a drive motion upon each of the lever arms 212a, 212b, 212c, and 212d. For example, a drive motion could be imparted on one of the lever arms of each of the gyroscope portions (e.g., lever arms 212a and 212c while others of the lever arms (e.g., 212b and 212d) are driven indirectly via the proof masses 216a, 216b, 216c, and 216d; proof mass springs 214a, 214b, 214c, and 214d; and coupling spring 218. In this manner, the lever arms 212b and 212d may continue to provide coupling between the respective proof masses and restrict the motion of said proof masses (e.g., based on the rotational motion about anchors 208b and 208d).

Although not depicted in FIGS. 2-5, it will be further understood that additional design variations may be provided and implemented in accordance with the present disclosure. In an embodiment, multiple drive masses may be associated with each lever arm to facilitate the rotational in-plane and out-of-plane motion of the lever arms. Drive masses and anchors may be located at any suitable location relative to the lever arms (e.g., drive masses located externally to the lever arms and anchors located between the lever arms), and a variety of drive decoupling springs (e.g., including multiple springs and or masses) may be provided to facilitate the decoupling of the drive and sense motions of the gyroscope. In some embodiments, the gyroscope of the present disclosure may have a single gyroscope portion (e.g., a single drive system and a single sense system) or additional (e.g., four) gyroscope portions. For example, a gyroscope may include additional sets of structures as described herein, such as multiple of the gyroscopes of FIGS. 2-5 further coupled to each other. An exemplary embodiment may couple one or more of the lever arms to a lever arm of another gyroscope portion, or one or more of the proof masses to additional proof masses of a another gyroscope.

Figure 6:
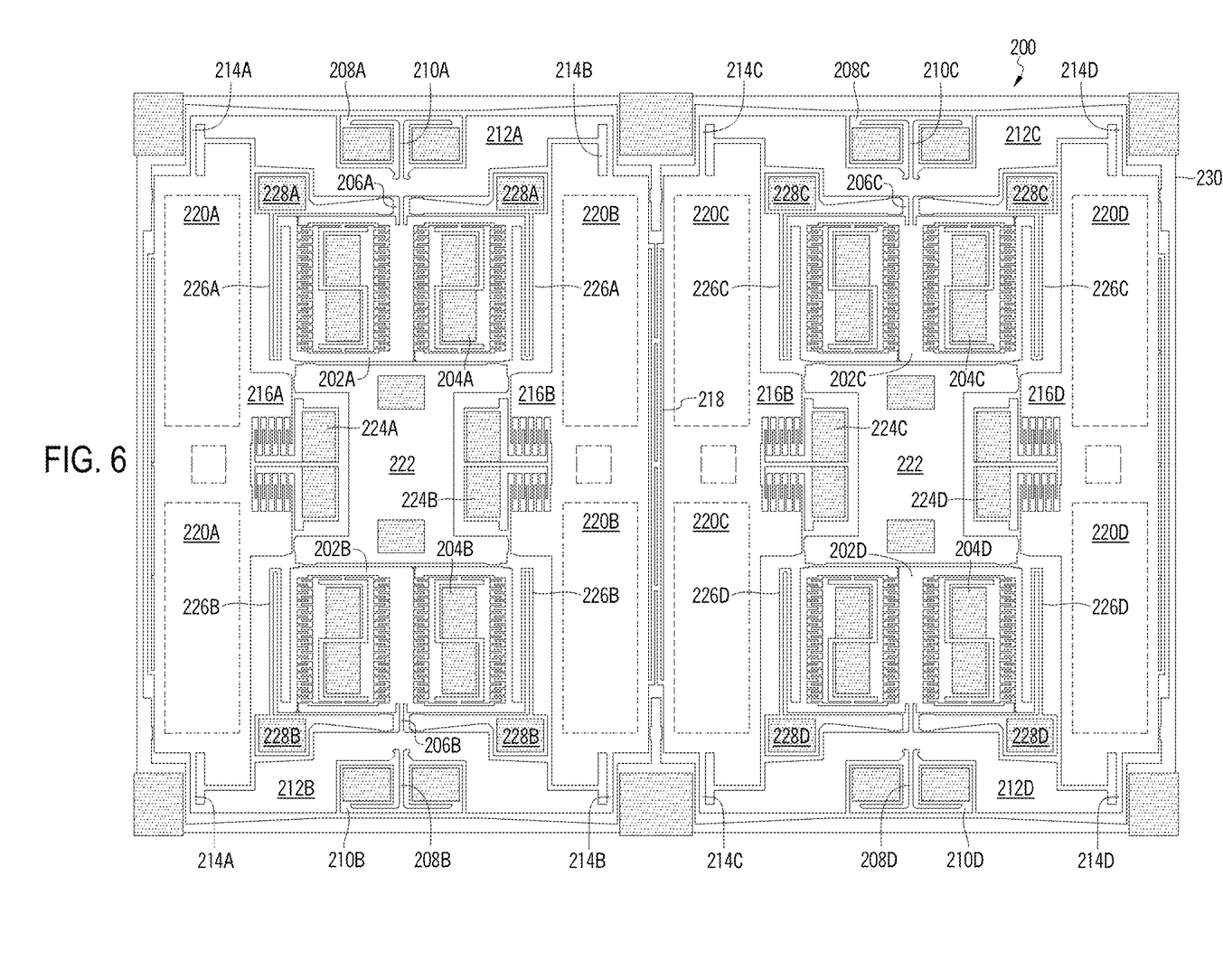
FIG. 6 shows an illustrative MEMS device layer of an out-of-plane sensing MEMS gyroscope device in accordance with an embodiment of the present disclosure.

FIG. 6 shows an illustrative MEMS device layer of an out-of-plane sensing MEMS gyroscope device in accordance with an embodiment of the present disclosure. Although numbering of components in FIG. 6 may generally conform to the numbering of similar items in FIGS. 2-5, it will be understood that components of FIG. 6 may be configured in a variety of different manners in accordance with the present disclosure, and that suitable modifications, additions, or removals from the structures depicted and described in FIG. 6 may be made as described herein or as understood by a person having ordinary skill in the art.

In an embodiment, the MEMS gyroscope of FIG. 6 may include a plurality of fixed anchored portions, including frame portion 230 and central portions 222. Frame portion 230 may be fixed and may surround the movable components of the MEMS layer. A plurality of anchors (e.g., at each of four corners of the frame portion 230 and at central horizontal points of frame portion 230) may extend from an underlying substrate layer and may fixedly attach to the MEMS portions of frame portion 230. In an embodiment, the frame portion may provide an area about which a hermetic seal is formed with other layers of the MEMS gyroscope (e.g., an underlying substrate layer and a cap layer, each having a cavity formed therein to accommodate the movable components of the MEMS device layer). Central portions 222 may be located at the interior of each of the gyroscope portions, located between the drive masses of each of the gyroscope portions and between the proof masses of each of the gyroscope portions. Central portions 222 may be anchored to the substrate via one or more anchors, and in some embodiments, may be coupled to portions of the cap or substrate layer that extend to MEMS device plane. Each of the frame portion 230 and central portions 222 may provide additional stability to the moveable structures of the MEMS device plane, and in some embodiments, may serve to limit air gaps that may create resistance to movement in a desired (e.g., drive or sense drive) direction, may limit movement of movable MEMS components outside of desired directions of movement, and may provide a filler of the space such that an etching load does not vary much in the chip.

Drive mass anchors 228a/228b/228c/228d and drive mass coupling springs 226a/226b/226c/226d may suspend and attach each of the respective drive masses 202a/202b/202c/202d within the MEMS device plane. The drive mass anchors may be fixed to the substrate and may extend into the MEMS device plane, while the drive mass coupling springs may be folded spring elements that are configured to be flexible along the drive axis (e.g., the x-axis) and rigid along other axes (e.g., the y-axis and z-axis). In this manner, the drive masses may generally restricted from moving other than in the drive axis, preventing coupling of the drive motion, sense drive motion, and sense motion. Further, each of the drive masses may be located in close proximity to a central portion 222 and to an extension from the drive mass anchors, further limiting movement of the drive masses other than along the drive axis.

In the exemplary embodiment of FIG. 6, each of the drive masses 202a/202b/202c/202d has two cavities formed therein, with each cavity having combs for interfacing with a comb-drive electrostatic actuator located therein. For example, drive mass 202a mas two cavities therein, each of which has a plurality of anchored electrostatic actuators 204a located therein for causing movement of the drive mass 202a in one of the x-axis drive directions of the drive mass 202a. When the electrostatic actuators 204a cause movement of drive mass 202a in a first drive direction (e.g., in the negative x-direction), similarly configured electrostatic actuators 204b may cause movement of drive mass 202b in the positive x-direction, similarly configured electrostatic actuators 204c may cause movement of drive mass 202c in the positive x-direction, and similarly configured electrostatic actuators 204d may cause movement of drive mass 202d in the negative x-direction. When the electrostatic actuators 204a cause movement of drive mass 202a in a second drive direction (e.g., in the positive x-direction), similarly configured electrostatic actuators 204b may cause movement of drive mass 202b in the negative x-direction, similarly configured electrostatic actuators 204c may cause movement of drive mass 202c in the negative x-direction, and similarly configured electrostatic actuators 204d may cause movement of drive mass 202d in the positive x-direction.

In the exemplary embodiment of FIG. 6, drive decoupling springs 206a/206b/206c/206d may connect each of the drive masses 202a/202b/202c/202d to an associated lever arm 212a/212b/212c/212d. Each of the drive decoupling springs may be configured such that the drive motion imparted on the drive masses is transferred to the lever arm, for example, by maintaining a sufficient aspect ratio of the drive decoupling springs in the drive direction such that the drive masses effectively pull the lever arms in the drive direction. In an embodiment, the drive decoupling springs may have sufficient torsional compliance such that any out of plane motion of the lever arms (e.g., in response to an out-of-plane Coriolis force imparted upon the proof masses) is not coupled to the drive masses. In this manner, the drive motion, sense drive motion, and sense motion may remain decoupled. In an embodiment, each of the drive decoupling springs 206a/206b/206c/206d may be located between extensions of respective drive mass anchors 228a/228b/228c/228d with sufficient clearance to accommodate the movement of the drive decoupling springs in the drive direction as well as any torsional movement drive decoupling springs.

Each of the lever arms 212a/212b/212c/212d may be coupled, at a central point of the lever arm and on a shared axis with the drive decoupling springs 206a/206b/206c/206d, to a respective anchor 208a/208b/208c/208d via a respective suspension spring 210a/210b/210c/210d. As a respective drive decoupling spring pulls the lever arm in one direction along the x-axis drive axis, the lever arm is caused to rotate about the anchor within the MEMS device plane. The respective directions of movement of the drive masses may be coordinated such that each of the drive masses of a drive system of a gyroscope portion rotates in the same (clockwise or counterclockwise) direction. For example, when the drive decoupling spring 206a pulls lever arm 212a in a first direction (e.g., in the negative x-direction), lever arm 212a will rotate in a clockwise motion about anchor 208a. At the same time, drive decoupling spring 206b pulls lever arm 212b in the positive x-direction causing clockwise rotation of lever arm 212b, drive decoupling spring 206c pulls lever arm 212c in the positive x-direction causing a counter-clockwise rotation of lever arm 212c, and drive decoupling spring 206b pulls lever arm 212d in the negative x-direction causing a counter-clockwise rotation of lever arm 212d. Similarly, when the drive decoupling spring 206a pulls lever arm 212a in a second direction (e.g., in the positive x-direction), lever arm 212a will rotate in a counter-clockwise motion about anchor 208a. At the same time, drive decoupling spring 206b pulls lever arm 212b in the negative x-direction causing counter-clockwise rotation of lever arm 212b, drive decoupling spring 206c pulls lever arm 212c in the negative x-direction causing a clockwise rotation of lever arm 212c, and drive decoupling spring 206b pulls lever arm 212d in the positive x-direction causing a clockwise rotation of lever arm 212d. In addition to the relative movement of the lever arms being coordinated based on controlling the drive direction of each of the drive masses, these motions are coupled via a coupling spring 118 that connects the two gyroscope portions via proof masses 216b and 216c.

Each of the lever arms 212a/212b/212c/212d is connected to two proof masses via two proof mass springs (e.g., lever arm 212a is connected to proof mass 216a via proof mass spring 214a and proof mass 216b via proof mass spring 214b, lever arm 212b is connected to proof mass 216a via proof mass spring 214a and proof mass 216b via proof mass spring 214b, lever arm 212c is connected to proof mass 216c via proof mass spring 214c and proof mass 216d via proof mass spring 214d, and lever arm 212d is connected to proof mass 216c via proof mass spring 214c and proof mass 216d via proof mass spring 214d). Each of the proof mass springs is relatively rigid in the y-direction, such that the y-axis movement at the end of each lever arm in response to the rotation of the lever arm causes the proof mass to move in the y-direction. Movement of the proof masses in only the y-direction is further restricted because each proof mass is coupled to a respective lever arm at each of its ends.

In exemplary embodiments as described herein, when lever arms 212a and 212b are rotating in a clockwise direction, this will cause proof mass 216a to move in the positive y-direction and proof mass 216b to move in the negative y-direction. At the same time, lever arms 212c and 212d will rotate in a counter-clockwise direction, causing proof mass 216c to move in the negative y-direction and proof mass 216d to move in the positive y-direction. When lever arms 212a and 212b are rotating in a counter-clockwise direction, this will cause proof mass 216a to move in the negative y-direction and proof mass 216b to move in the positive y-direction. At the same time, lever arms 212c and 212d will rotate in a clockwise direction, causing proof mass 216c to move in the positive y-direction and proof mass 216d to move in the negative y-direction. The movement of the proof masses of each of the gyroscope portions is further restricted by coupling spring 218, which is configured to be rigid in the y-direction such that proof masses 216b and 216c should generally move in unison, which also impacts movement of proof masses 216a and 216d via the lever arms.

Each of the proof masses 216a/216b/216c/216d may form a sense capacitor with a respective in-plane drive sense electrode 224a/224b/224c/224d. Although the drive sensing may be performed in a variety of suitable manners (e.g., piezoelectric sensing, capacitive sensing, optical sensing, etc.) based on measured movement of a variety of suitable components (e.g., lever arms 212a/212b/212c/212d), in an embodiment drive sensing may be formed by respective comb fingers that extend along the y-axis (e.g., in the sense drive direction) from the proof masses 216a/216b/216c/216d and that are interdigitated with complementary combs of anchored drive sense electrodes 224a/224b/224c/224d. As the proof masses move along the y-axis, the differential capacitance at each of the sets of drive sense electrodes will change in a manner that is proportional to the movement of the proof masses along the y-axis. These drive sense signals may be provided in an open-loop or closed-loop feedback system to adjust the signals that are provided to the drive electrodes 204a/204b/204c/204d, e.g., to better balance the drive motion imparted upon the drive masses or to adjust the overall degree of movement that is imparted by the drive system.

As described herein, rotation about the measured axis (e.g., about the x-axis) may cause a Coriolis force along the z-axis when the proof masses are oscillating in the y-axis. Because the two proof masses of each of the gyroscope portions are always moving in the opposite direction, one of the proof masses of each of the gyroscope portions will experience a Coriolis force in the positive z-direction while the other of the proof masses will experience a Coriolis force in the negative z-direction, with the respective direction of the Coriolis force dependent on the y-axis direction of movement of the proof mass and the direction of the rotation about the axis. This will cause one of the proof masses to move out of plane in the positive z-direction and the other of the proof masses to move out of plane in the negative z-direction. These forces will cause a rotation of the lever arms of each of the gyroscope portions about the y-axis, via torsional movement of the suspension spring and drive decoupling spring attached to each of the lever arms. In embodiments where the drive motions of the gyroscope portions and/or the coupling spring connects proof masses of the gyroscope portions, the lever arms of the respective gyroscope should rotate about the y-axis such that proof masses 216a and 216d move in unison out of plane, and such that proof masses 216b and 216c move in unison out of plane.

FIG. 6 also depicts sense electrodes 220a/220b/220c/220d associated with respective proof masses 216a/216b/216c/216d. Each of the sense electrodes may be fixed on another layer of the gyroscope (e.g., on a parallel substrate layer located below the proof masses). Each of the sense electrodes may form a capacitor with its associated proof mass, and may have a capacitance that changes based on the z-axis distance between the sense electrode and associated proof mass. Differential measurement of the capacitances sensed at the respective sense electrodes may be determined, and based on known correlations and scaling factors, angular velocity may be determined based on the movements of the proof masses.

In an embodiment, the gyroscope designs described herein may have sense and drive frequencies that are the lowest modes in the system. In this manner, the gyroscope may be capable of tolerating greater external forces such as linear acceleration, angular acceleration, or angular velocity (i.e., about axes other than the measured axis) due to shock, vibration, or other similar causes. The designed drive frequency and sense frequency (e.g., a drive frequency of 28 kHz, an unsoftened sense resonator frequency of 27.1 kHz, and a sense frequency of 25.2 kHz) may be such that the derivative of the sense sensitivity s with respect to the sense gap g (i.e., ds/dg) is nominally zero. As a result, the sensor sensitivity may be robust against environmental or other lifetime changes in the detection gap over the gyroscopes life of operation. This condition may be expressed according to the following:

$$f_s^2 = 3f_{s0}^2 - 2f_d^2$$

where:

$f_s$=electrostatically softened sense resonator frequency;
$f_{s0}$=unsoftened sense resonator frequency; and
$f_d$=drive frequency.

If the gap g is increased, then the electrostatic softening is reduced, and the frequency between drive and sense modes is reduced, thus making the gain factor larger. The larger gain factor may result in a larger mechanical amplitude, which in turn may result in a larger mechanical amplitude that compensates the reduction in capacitance. Overall, the sensitivity of the sensor remains constant against changes in the detection gap.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

It will be understood that the configurations of masses, springs, levers, anchors, electrodes, and similar components are exemplary only and that various configurations from multiple figures may be combined in suitable manners. It will further be understood that other suitable modifications, additions, removals, optimizations, or variations may be implemented by a person having ordinary skill in the art or as is described herein.

What is claimed is:

1. A gyroscope, comprising:
   a plurality of drive masses located in a device plane, wherein the plurality of drive masses are driven in anti-phase along a first axis in the device plane;
   a plurality of anchors at least partially located in the device plane;

a plurality of lever arms located in the device plane, wherein each of the plurality of lever arms is coupled between a respective drive mass of the plurality of drive masses and a respective anchor of the plurality of anchors, and wherein each of the plurality of lever arms rotates in the device plane about a second axis perpendicular to the device plane in response to the anti-phase movement of the respective drive mass and the coupling of the respective lever arm to the respective anchor;

a plurality of decoupling springs, wherein each of the plurality of lever arms is coupled to the respective drive mass of the plurality of drive masses by a respective decoupling spring of the plurality of decoupling springs;

a plurality of proof masses located in the device plane, wherein each of the plurality of proof masses is coupled to the plurality of lever arms, wherein each of the plurality of proof masses moves along a third axis in the device plane in response to the rotation of the plurality of lever arms in the device plane, wherein the plurality of proof masses move in anti-phase along the second axis in response to an angular velocity about the first axis, and wherein the third axis is perpendicular to the first axis and the second axis; and processing circuitry configured to determine the angular velocity about the first axis based on the anti-phase movement of the first plurality of proof masses along the second axis.

2. The gyroscope of claim 1, further comprising a plurality of suspension springs, wherein each respective lever arm is coupled to the respective anchor by a respective suspension spring of the plurality of suspension springs.

3. The gyroscope of claim 2, wherein each respective lever arm rotates about the second axis at the location of the coupling to the respective suspension spring.

4. The gyroscope of claim 1, wherein the decoupling springs permit the movement of the plurality of lever arms out of the device plane in response to the movement of the plurality of proof masses along the second axis.

5. The gyroscope of claim 1, wherein each respective decoupling spring and each respective suspension spring that are associated with a respective lever arm are located on opposite sides of the respective lever arm within the device plane.

6. The gyroscope of claim 5, wherein each respective decoupling spring and each respective suspension spring that are associated with a respective lever arm are located along a shared axis within the device plane.

7. The gyroscope of claim 6, wherein the shared axis comprises the third axis.

8. The gyroscope of claim 1, further comprising a plurality of proof mass springs, wherein each proof mass spring couples a respective lever arm to a respective proof mass.

9. The gyroscope of claim 8, wherein each of the plurality of proof mass springs couples an edge of the respective lever arm to an end of a respective proof mass.

10. The gyroscope of claim 9, wherein each of the plurality of proof masses is located between two lever arms and coupled at two opposite ends to each of the two lever arms.

11. The gyroscope of claim 1, further comprising a plurality of sense electrodes located in a sensing plane parallel to the device plane and extending parallel to the plurality of proof masses.

12. The gyroscope of claim 11, wherein the angular velocity is determined based on one or more distances along the second axis between the plurality of sense electrodes and the plurality of proof masses.

13. The gyroscope of claim 1, wherein the plurality of drive masses are located between the plurality of lever arms.

14. The gyroscope of claim 13, wherein the plurality of drive masses are located between the plurality of proof masses.

15. The gyroscope of claim 13, wherein the plurality of lever arms are located between the plurality of anchors.

16. A gyroscope, comprising:
a first plurality of drive masses located in a device plane, wherein the first plurality of drive masses are driven in anti-phase along a first axis in the device plane;

a first plurality of anchors at least partially located in the device plane;

a first plurality of lever arms located in the device plane, wherein each of the first plurality of lever arms is coupled between a respective first drive mass of the first plurality of drive masses and a respective first anchor of the first plurality of anchors, and wherein each of first the plurality of lever arms rotates in the device plane about a second axis perpendicular to the device plane in response to the anti-phase movement of the respective first drive mass and the coupling of the respective lever arm to the respective first anchor;

a first plurality of decoupling springs, wherein each of the first plurality of lever arms is coupled to the respective first drive mass of the first plurality of drive masses by a respective first decoupling spring of the first plurality of decoupling springs;

a first plurality of proof masses located in the device plane, wherein each of the first plurality of proof masses is coupled to the first plurality of lever arms, and wherein each of the first plurality of proof masses moves along a third axis in the device plane in response to the rotation of the first plurality of lever arms in the device plane, and wherein the first plurality of proof masses move in anti-phase along the second axis in response to an angular velocity about the first axis, and wherein the third axis is perpendicular to the first axis and the second axis; and a second plurality of drive masses located in the device plane, wherein the second plurality of drive masses are driven in anti-phase along the first axis in the device plane;

a second plurality of anchors at least partially located in the device plane;

a second plurality of lever arms located in the device plane, wherein each of the second plurality of lever arms is coupled between a respective second drive mass of the second plurality of drive masses and a respective second anchor of the second plurality of anchors, and wherein each of second the plurality of lever arms rotates about the second axis in response to the anti-phase movement of the respective second drive mass and the coupling of the respective lever arm to the respective second anchor;

a second plurality of decoupling springs, wherein each of the second plurality of lever arms is coupled to the respective second drive mass of the second plurality of drive masses by a respective second decoupling spring of the second plurality of decoupling springs;

a second plurality of proof masses located in the device plane, wherein each of the second plurality of proof masses is coupled to the second plurality of lever arms, and wherein each of the second plurality of proof masses moves along the third axis in the device plane in response to the rotation of the second plurality of lever arms, and wherein the second plurality of proof masses move in anti-phase along the second axis in response to the angular velocity about the first axis; and processing circuitry configured to determine the angular velocity about the first axis based on the anti-phase movement of the first plurality of proof masses along the second axis and the anti-phase movement of the second plurality of proof masses along the second axis.

17. The gyroscope of claim 16, further comprising a phase coupling between one of the first plurality of proof masses and one of the second plurality of proof masses, and wherein the proof masses coupled by the phase coupling move in phase with each other.

18. The gyroscope of claim 17, wherein the proof masses coupled by the phase coupling are located adjacent to each other, and wherein the gyroscope is symmetrical about a first symmetry line located in the device plane between and in parallel with the adjacent proof masses.

19. A gyroscope, comprising:
a plurality of drive masses located in a device plane, wherein the plurality of drive masses are driven in anti-phase along a first axis in the device plane;
a plurality of anchors at least partially located in the device plane;
a plurality of decoupling springs located in the device plane;
a plurality of suspension springs located in the device;
a plurality of lever arms located in the device plane, wherein each of the plurality of lever arms is coupled to a respective drive mass of the plurality of drive masses via a respective decoupling spring of the plurality of decoupling springs and to a respective anchor of the plurality of anchors via a respective suspension spring of the plurality of suspension springs, and wherein each of the plurality of lever arms rotates about a second axis in response to the anti-phase movement of the respective drive mass and the coupling of the respective lever arm to the respective anchor;
a plurality of proof masses located in the device plane, wherein each of the plurality of proof masses is coupled to the plurality of lever arms, and wherein each of the plurality of proof masses moves along a third axis in the device plane in response to the rotation of the plurality of lever arms, and wherein the plurality of proof masses move in anti-phase out of the device plane in response to an angular velocity about the first axis; and processing circuitry configured to determine the angular velocity about the first axis based on the anti-phase movement of the first plurality of proof masses along the second axis.

20. A gyroscope, comprising:
a plurality of drive masses located in a device plane, wherein the plurality of drive masses are driven in anti-phase along a first axis in the device plane;
a plurality of anchors at least partially located in the device plane;
a plurality of lever arms located in the device plane, wherein each of the plurality of lever arms is coupled between a respective drive mass of the plurality of drive masses and a respective anchor of the plurality of anchors, and wherein each of the plurality of lever arms rotates in the device plane about a second axis perpendicular to the device plane in response to the anti-phase movement of the respective drive mass and the coupling of the respective lever arm to the respective anchor;
a plurality of suspension springs, wherein each of the plurality of lever arms is coupled to the respective anchor of the plurality of anchors by a respective suspension spring of the plurality of suspension springs;
a plurality of proof masses located in the device plane, wherein each of the plurality of proof masses is coupled to the plurality of lever arms, wherein each of the plurality of proof masses moves along a third axis in the device plane in response to the rotation of the plurality of lever arms in the device plane, wherein the plurality of proof masses move in anti-phase along the second axis in response to an angular velocity about the first axis; and wherein the third axis is perpendicular to the first axis and the second axis; and processing circuitry configured to determine the angular velocity about the first axis based on the anti-phase movement of the first plurality of proof masses along the second axis.

21. The gyroscope of claim 20, wherein each respective lever arm rotates about the second axis at the location of the coupling to the respective suspension spring.

* * * * *